(12) United States Patent
Matsushita et al.

(10) Patent No.: US 9,567,228 B2
(45) Date of Patent: Feb. 14, 2017

(54) CATALYST FOR PRODUCING HIGHER SILANE AND PROCESS FOR PRODUCING HIGHER SILANE

(71) Applicant: MITSUI CHEMICALS, INC., Minato-ku, Tokyo (JP)

(72) Inventors: Tatsumi Matsushita, Takaishi (JP); Yoshinori Nouji, Takaishi (JP); Akira Matsuura, Higashiosaka (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/030,802

(22) PCT Filed: Oct. 16, 2014

(86) PCT No.: PCT/JP2014/077538
§ 371 (c)(1),
(2) Date: Apr. 20, 2016

(87) PCT Pub. No.: WO2015/060189
PCT Pub. Date: Apr. 30, 2015

(65) Prior Publication Data
US 2016/0257571 A1  Sep. 8, 2016

(30) Foreign Application Priority Data

Oct. 21, 2013 (JP) ................. 2013-218262

(51) Int. Cl.
| | |
|---|---|
| *C01B 31/04* | (2006.01) |
| *C01B 33/04* | (2006.01) |
| *B01J 29/18* | (2006.01) |
| *B01J 29/40* | (2006.01) |
| *B01J 38/10* | (2006.01) |
| *B01J 29/06* | (2006.01) |
| *B01J 29/70* | (2006.01) |
| *B01J 35/10* | (2006.01) |
| *B01J 29/90* | (2006.01) |

(52) U.S. Cl.
CPC .............. *C01B 33/04* (2013.01); *B01J 29/061* (2013.01); *B01J 29/18* (2013.01); *B01J 29/40* (2013.01); *B01J 29/7007* (2013.01); *B01J 35/1057* (2013.01); *B01J 38/10* (2013.01); *B01J 29/90* (2013.01); *Y02P 20/584* (2015.11)

(58) Field of Classification Search
CPC .............................. C01B 31/043; C01B 31/04
USPC .......................................................... 423/347
See application file for complete search history.

(56) References Cited

U.S. PATENT DOCUMENTS

| | | | |
|---|---|---|---|
| 6,027,705 A | 2/2000 | Kitsuno et al. | |
| 2006/0222583 A1 | 10/2006 | Hazeltine | |
| 2011/0189072 A1 | 8/2011 | Brausch et al. | |
| 2012/0263639 A1 | 10/2012 | Brausch et al. | |

FOREIGN PATENT DOCUMENTS

| | | | |
|---|---|---|---|
| JP | S36-21507 A | 11/1961 | |
| JP | S57-27915 A | 2/1982 | |
| JP | S60-141613 A | 7/1985 | |
| JP | S60-255612 A | 12/1985 | |
| JP | S62-132720 A | 6/1987 | |
| JP | H03-183613 A | 8/1991 | |
| JP | H03-183614 A | 8/1991 | |
| JP | H11-260729 A | 9/1999 | |
| JP | 2011-524329 A | 9/2011 | |
| JP | 4855462 B | 1/2012 | |
| JP | 2013-506541 A | 2/2013 | |

OTHER PUBLICATIONS

International Search Report (PCT/ISA/210) mailed on Dec. 9, 2014, by the Japanese Patent Office as the International Searching Authority for International Application No. PCT/JP2014/077538.
Written Opinion (PCT/ISA/237) mailed on Dec. 9, 2014, by the Japanese Patent Office as the International Searching Authority for International Application No. PCT/JP2014/077538.
CH Baerlocher et al., "Atlas of Zeolite Framework Types", Sixth Revised Edition, 2007, Elsevier, 405 pages.

*Primary Examiner* — Edward Johnson
(74) *Attorney, Agent, or Firm* — Buchanan, Ingersoll & Rooney PC (57) ABSTRACT

Provided are a catalyst for producing a higher silane with high yield at low cost by performing a reaction at relatively low temperature while inhibiting decomposition into solid silicon; and a process using the catalyst for producing a higher silane. The catalyst for producing a higher silane includes a porous oxide and is used to convert a lower silane to a higher silane wherein the porous oxide has at least regularly arranged pores and is primarily composed of silicon oxide, wherein a content of alkali metals and alkali earth metals in the porous oxide is not less than 0.00 wt % and not more than 2.00 wt %.

19 Claims, 1 Drawing Sheet

Schematic View of Experiment Apparatus

– 1 –

CATALYST FOR PRODUCING HIGHER SILANE AND PROCESS FOR PRODUCING HIGHER SILANE

TECHNICAL FIELD

The present invention relates to a catalyst for producing a higher silane, and a process for producing a higher silane.

BACKGROUND ART

With recent advancement in electronics industry, there has been rapid increase in demand for silicon-based thin films used for the production of semiconductors, such as polycrystalline silicon thin films or amorphous silicon thin films. These days, the importance of monosilane ($SiH_4$) and higher silanes ($Si_nH_{2n+2}$; n is an integer of 2 or more) such as disilane ($Si_2H_6$) have been increasing as raw materials used to produce those silicon-based thin films used for the production of semiconductors. The demand for disilane, in particular, is expected to significantly increase as a raw material of silicon-based thin films used for the production of microfabricated latest semiconductors.

Hitherto known processes for producing a higher silane such as disilane include:

(1) a production process utilizing hydrogen reduction of silicon using hydrogen sulfide or a metal sulfide as a catalyst (Patent Literature 1); (2) a production process utilizing the reduction of a silicon chloride compound (Patent Literature 2); (3) a production process utilizing the reaction between a silicon oxide having a silicon-hydrogen bond or a silicon-silicon bond, and a hydride, an alkoxide or an amalgam of an alkali metal or an alkali earth metal, (Patent Literature 3); (4) a production process utilizing the decomposition of magnesium silicide with an acid (Patent Literature 4); (5) a production process utilizing the discharge in a monosilane gas (Patent Literature 5); and (6) a production process utilizing the condensation of monosilane using a transition metal complex as a catalyst (Patent Literature 6).

Production processes are also reported in which a lower silane is subjected to, for example, thermal treatment in order to be converted to a higher silane (Patent Literatures 7, 8 and 9). In these techniques, for example, monosilane is thermally treated at 350 to 550° C. to produce a higher silane.

In another known production process, thermal treatment is carried out with the use of a catalyst which is alumina, a composite oxide containing alumina, or an alumina containing a noble metal element such as palladium and rhenium; in which technique, disilane is produced from monosilane at a temperature as low as about 300° C. (Patent Literature 10).

In the production of the silicon-based thin films used for materials like semiconductors, there is continuing demand for technology that fulfills not just economic efficiency but also allows for stable and efficient production on an industrial scale.

CITATION LIST

Patent Literature

[Patent Literature 1] JP-B-S36-21507
[Patent Literature 2] JP-A-S57-27915
[Patent Literature 3] JP-A-S60-255612
[Patent Literature 4] JP-A-S60-141613
[Patent Literature 5] JP-A-S62-1322720
[Patent Literature 6] JP-A-2011-524329
[Patent Literature 7] JP-A-H3-183614
[Patent Literature 8] JP-A-H11-260729
[Patent Literature 9] JP-B-4855462
[Patent Literature 10] JP-A-H3-183613

SUMMARY OF THE INVENTION

Technical Problem

As described above, several methods are known for producing a higher silane (for example, disilane provided when a lower silane used as a raw material is monosilane). In the production by the thermal treatment of monosilane, the temperature which has conventionally needed to be high ranging from 350 to 500° C. has now been able to be lower to be around 300° C. by the co-presence of a catalyst. Higher temperature at which monosilane is treated causes easier severing of a silicon-hydrogen bond and occurrence of a silicon-silicon bond, resulting in increased reactivity of monosilane, but promotes a higher silane produced, e.g., disilane, to become a much higher silane, and if this proceeds too far, a powdery or film-like solid silicon is produced. This would reduce the selectivity of the higher silane which is a desired target product, e.g., disilane, and moreover the deposition of that solid silicon in a reaction system including a reactor would induce problems such as the clogging of lines in the system. Thus, lowering the treatment temperature by the use of catalysts is preferable in view of the selectivity of the target product and the inhibition of the precipitation of powders. In known methods, however, the selectivity of higher silanes (for example, disilane provided when a lower silane used as a raw material is monosilane) is still unsatisfactory, and elevating the treatment temperature in order to promote the reaction unfavorably leads to the powders being produced in a larger amount.

In view of the above, an object of the present invention is to provide a catalyst, used in the reaction where a lower silane is converted to a higher silane, for a production achieving a high selectivity of a target product with inhibited occurrence of powders, as well as provide a process using the catalyst for producing a higher silane.

Technical Solution

In order to remedy the above-identified problem, the present inventors considered the need for catalysts promoting the reaction at a lower temperature, focused on solid catalysts which are easily separable in a gas-phase reaction, and explored various solid compounds.

As a result, it has been found that using, as the catalyst for producing a higher silane from a lower silane (for example, monosilane), a solid catalyst which is a specific porous material whose surfaces have regularly arranged pores with their sizes uniform to some degree and which includes acid sites with controlled strength and distribution, beneficially leads to lowering the temperature of the thermal treatment, and is highly effective in inhibiting the occurrence of solid silicon and improving the selectivity of the target product. The present invention has been completed based on this finding.

That is, the present invention is directed to a catalyst for producing a higher silane and to a process using the catalyst for producing a higher silane, including the following aspects [1] to [19].

[1] A catalyst for producing a higher silane which comprises a porous oxide and which by being contacted with a lower silane converts the lower silane to the higher silane having more silicon than the lower silane, wherein the porous oxide has at least regularly arranged pores and is primarily composed of silicon oxide, wherein a content of alkali metals and alkali earth metals in the porous oxide is not less than 0.00 wt % and not more than 2.00 wt %.

[2] The catalyst for producing a higher silane described in [1], wherein the porous oxide has a pore diameter of not less than 0.4 nm and not more than 0.6 nm.

[3] The catalyst for producing a higher silane described in [1] or [2], wherein the pore of the porous oxide is composed of an 8 to 12-membered oxygen ring.

[4] The catalyst for producing a higher silane described in any one of [1] to [3], wherein the porous oxide has a crystalline zeolite structure formed from aluminosilicate or metallosilicate.

[5] The catalyst for producing a higher silane described in [4], wherein the crystalline zeolite structure is at least any one of BEA-type, FER-type, LTA-type, MFI-type, MOR-type and MWW-type.

[6] The catalyst for producing a higher silane described in [4] or [5], wherein alkali metal ions or alkali earth metal ions compensating for a negative charge of the aluminosilicate or metallosilicate skeleton in the porous oxide are substituted with hydrogen ions.

[7] The catalyst for producing a higher silane described in any one of [4] to [6], wherein the porous oxide is aluminosilicate, and a $SiO_2/Al_2O_3$ molar ratio in the porous oxide is not less than 10 and not more than 3,000.

[8] The catalyst for producing a higher silane described in [7], wherein the $SiO_2/Al_2O_3$ molar ratio is not less than 20 and not more than 2,000.

[9] A process for producing a higher silane comprising bringing a lower silane into contact with the catalyst for producing a higher silane described in any one of [1] to [8] thereby converting the lower silane to the higher silane having more silicon than the lower silane.

[10] The process for producing a higher silane described in [9], wherein the lower silane is brought into contact with the catalyst for producing the higher silane at a temperature lower than a temperature at which the higher silane starts to be substantially produced through thermal decomposition of the lower silane under conditions where no catalysts are present.

[11] The process for producing a higher silane described in [9], wherein the temperature at which the lower silane is brought into contact with the catalyst for producing a higher silane is not lower than 100° C. and not higher than 400° C.

[12] The process for producing a higher silane described in [11], wherein the temperature is not lower than 120° C. and not higher than 350° C.

[13] The process for producing a higher silane described in [11], wherein the temperature is not lower than 140° C. and not higher than 300° C.

[14] The process for producing a higher silane described in any one of [9] to [13], wherein the lower silane is supplied by a raw material gas including a lower silane, and a concentration of the lower silane in the raw material gas is not less than 50 vol % and not more than 100 vol %.

[15] The process for producing a higher silane described in any one of [9] to [14], wherein the lower silane is monosilane, and the higher silane is disilane and trisilane.

[16] The process for producing a higher silane described in any one of [9] to [14], wherein the lower silane is monosilane, and the higher silane is disilane.

[17] The process for producing a higher silane described in any one of [9] to [14], wherein the lower silane is disilane, and the higher silane is trisilane.

[18] The process for producing a higher silane described in any one of [9] to [14], comprising a step of subjecting the catalyst for producing a higher silane to an activation treatment using a hydrogen-containing gas.

[19] The process for producing a higher silane catalyst described in [18], wherein at the step of subjecting the catalyst for producing a higher silane to an activation treatment using a hydrogen-containing gas, the treatment temperature is not less than 20° C.

Effects of the Invention

According to the catalyst for producing a higher silane of the present invention, a reaction of converting a lower silane to a higher silane can be allowed to proceed at a relatively low temperature, while the occurrence of solid silicon is inhibited and the selectivity of the higher silane being a target product is increased.

DESCRIPTION OF EMBODIMENTS

Hereinafter, embodiments according to the present invention will be described in detail.

The present invention includes a catalyst for producing a higher silane compound through a reaction of a lower silane at a relatively low temperature, and a process using the catalyst for producing a higher silane from a lower silane.

(Catalyst for Producing a Higher Silane)

The catalyst used for producing a higher silane from a lower silane in the present invention comprises a porous oxide. The porous oxide is primarily composed of silicon oxide, wherein its content is preferably not less than 60 wt % and not more than 100 wt %. Components contained therein other than silicon oxide are not particularly limited as long as being those generally contained as catalyst carriers. Examples thereof include aluminum oxide, titanium oxide, zirconium oxide, zinc oxide, magnesium oxide, iron oxide, boron oxide and gallium oxide. These components contained may be physically mixed with silicon oxide, or may be chemically formed into a composite (composite oxide).

The porous oxide containing silicon oxide as a main component in the present invention has uniform pores. The uniform pores used herein refer to regularly arranged pores, wherein the diameter of the regularly arranged pores is preferably not less than 0.4 nm and not more than 0.6 nm. The pore of the porous oxide can be determined by nitrogen absorption method. In examples of the present invention, values indicated in Atlas of Zeolite Framework Types, Sixth revised edition (Elsevier) of International Zeolite Association were used. In the case where the pores have multiple diameters, and when there is at least one diameter falling in the range of from 0.4 nm to 0.6 nm, that diameter is described.

The pore of the catalyst containing silicon oxide as a main component in the present invention is formed by repeating bonds each including a silicon-oxygen bond and another element (for example, aluminum, titanium, zirconium, magnesium, zinc, and the like)-oxygen bond which is incorporated as needed into the skeleton formed by that silicon-oxygen bond. When structures of the bonds are the same, sizes of the pore diameters can be expected to be the same.

In the present invention, it is preferred that the pore of the porous oxide is composed of an 8 to 12-membered oxygen ring, since a pore diameter to be provided when the number of oxygen atoms is from 8 to 12, i.e., an 8 to 12-membered oxygen ring, has a size which is substantially a target size. If multiple kinds of rings are present in a single compound, it is preferred that the ring having the largest number of oxygen atoms is the 8 to 12-membered oxygen ring.

The catalyst needs to have pores and in addition their sizes need to be controlled, as described above, for reasons believed to be that the presence of such pores in the catalyst allows the reaction of converting a lower silane to a higher silane to proceed within those pores promptly since the catalyst has a surface area increased, and the pores with their sizes controlled moderately contributes to improved selectivity of a higher silane which is a target product (for example, disilane).

The content of alkali metals and alkali earth metals contained in the porous oxide constituting the catalyst of the present invention is not less than 0.00 wt % and not more than 2.00 wt %, and preferably is not less than 0.00 wt % and not more than 1.00 wt %, more preferably being not more than 0.5 wt %. The above values are contents of alkali metals and alkali earth metals regarded as metals contained in the catalyst, and can be measured by a method such as ICP Optical Emission Spectrometry, ICP Mass Spectrometry and Atomic Absorption Spectrometry.

In the case, for example, where a substance containing a silicate such as an alkali metal silicate or an alkali earth metal silicate is used as a raw material for producing the silicon oxide employed in the catalyst of the present invention, the raw material contains the alkali metal or the alkali earth metal in the form of ions, so that the silicon oxide used in the present invention can contain an alkali metal ion or an alkali earth metal ion. By treating the silicon oxide with an acid, the alkali metal ions or alkali earth metal ions are removed and are replaced by hydrogen ions in order that electrical neutrality is kept. The hydrogen ions function as Broensted acid: controlling their amount leads to controlling not just the distribution of acid amount but also acid strength. It is presumed that the reaction of converting a lower silane to a higher silane in the present invention is promoted by the presence of acid sites, and that depending on the strength and the distribution of acid sites, change is brought about in the reaction speed and the selectivity in the reaction.

The porous oxide used for the catalyst of the present invention has uniform and regular pores as described above, wherein it is preferred that the porous oxide is crystalline, and regularly arranged pores attributed to that crystalline structure are formed. In this case, while silicon oxide (silicon-oxygen bond) alone can form the crystal, the crystal may have aluminum or other metals, if any, incorporated therein. As such crystalline porous oxides primarily containing silicon oxide, aluminosilicate containing aluminum and silicon; and a metallosilicate containing a metal other than aluminum (for example, titanium, zirconium, zinc, iron, boron, gallium and the like) and silicon, are known. Of these crystalline silicon oxides, crystalline zeolites are preferred in terms of having uniform pores.

The crystalline zeolites used preferably as the catalyst of the present invention generally have a composition represented by the following formula (I).

$$(M^1, M^2{}_{1/2})_m(Al_mSi_nO_{2(m+n)}) \cdot xH_2O \quad (I)$$

In the formula (I), $M^1$ is an alkali metal ion such as Li$^+$, Na$^+$ and K$^+$ or a hydrogen ion; $M^2$ is an alkali earth metal ion such as Ca$^{2+}$, Mg$^{2+}$ and Ba$^{2+}$; and m and n are each an integer, n≥m; and x is an integer.

In the above zeolites, cations of $M_1$ and $M_2$ have a composition which compensates for the negative charge of the aluminosilicate skeleton formed by $Al_mSi_nO_{2(m+n)}$. Fundamental structures of the zeolites are tetrahedron structures of $SiO_4$ or $AlO_4$ that range infinitely in three-dimensional directions to form the crystal. The above zeolites may have a metallosilicate skeleton in which at least part of an aluminum element of the formula (I) is substituted with another element such as zinc, iron, boron, gallium and phosphorus. Zeolites may be used which have a skeleton in which at least part of a silicon element of the above zeolites is substituted with another element.

While the above zeolites may be natural ones (naturally occurring zeolites), synthetic zeolites, which have high regularity, are preferred in terms of the use as the catalyst. Synthetic zeolites are generally produced by using a silica source, which is, for example, water glass, sodium silicate, colloidal silica and the like; mixing this with a compound giving an alumina source, or with a compound giving a source of an oxide of the above-mentioned element such as iron, boron, titanium, gallium and phosphorus; and subjecting the mixture to hydrothermal synthesis in an aqueous alkali solution. The zeolite produced by the hydrothermal synthesis, as it is, remains to have an alkali metal such as sodium and potassium, as represented in the formula (I), and when used at this state through its contact with a lower silane for conversion to a higher silane, the catalytic activity is low.

In the present invention, as described above, it is necessary in the zeolite represented by the formula (I) that the whole or at least part of alkali metal ions and alkali earth metal ions is substituted with hydrogen ions by e.g., ion exchange, and consequently the content of the alkali metals and the alkali earth metals is not less than 0.00 wt % and not more than 2.00 wt %. The silicon oxide (typically, zeolite), by virtue of the above, is presumed to have acid sites exhibiting on its surfaces, thus having catalytic activity. The crystalline structure varies depending on its synthesis conditions. Since change in the structure leads to change in regularity, acid distribution and strength, too, are also expected to vary. In fact, difference in the skeleton structure leads to difference in reactivity of silanes.

Skeleton structures of the zeolites are included in the database made by International Zeolite Association, each represented by a structure code of three capital letters of alphabet. Examples of the zeolites include BEA-type zeolite, FER-type zeolite, LTA-type zeolite, MFI-type zeolite, MOR-type zeolite, MWW-type zeolite, LTL-type zeolite, FAU-type zeolite, ERI-type zeolite, CHA-type zeolite and OFF-type zeolite.

Among the zeolites, in terms of achieving good reaction of converting a lower silane to a higher silane, BEA-type zeolite, FER-type zeolite, LTA-type zeolite, MFI-type zeolite, MOR-type zeolite and MWW-type zeolite are preferred; and MFI-type zeolite is more preferred. These zeolites are presumed to have an acid distribution and acid strength appropriate for the above reaction.

Examples of the BEA-type zeolite include β-type zeolite. Examples of the FER-type zeolite include ferrierite. Examples of the LTA-type zeolite include A-type zeolite. Examples of the MFI-type zeolite include ZSM-5. Examples of the MOR-type zeolite include mordenites. Examples of the MWW-type zeolite include MCM-22. Examples of the LTL-type zeolite include L-type zeolite. Examples of the FAU-type zeolite include X-type zeolite, Y-type zeolite and faujasite. Examples of the ERI-type zeolite include erionite.

Examples of the CHA-type zeolite include chabazite. Examples of the OFF-type zeolite include offretite. Of these zeolites, MFI-type zeolite is more preferred.

When the porous oxide of the present invention is a crystalline oxide containing aluminosilicate or metallosilicate, it is preferred that part or the whole of alkali metal ions or alkali earth metal ions compensating for the negative charge of the aluminosilicate or metallosilicate skeleton in the porous oxide is substituted with hydrogen ions. The amount of hydrogen ions contained in aluminosilicate or metallosilicate can be calculated by subtracting the total amount of alkali metal ions and alkali earth metal ions contained in aluminosilicate or metallosilicate from the total amount of ions necessary to compensate for the negative charge of the aluminosilicate or metallosilicate skeleton to keep electrical neutrality. Since hydrogen ions function as an acid as described above, the amount of hydrogen ions calculated represent the amount of acid contained in the porous oxide.

When the porous oxide of the present invention is a crystalline oxide containing aluminosilicate or metallosilicate (typically, zeolite), the conversion to hydrogen ions of alkali metal ions or alkali earth metal ions contained in aluminosilicate or metallosilicate in the porous oxide can be conducted in a way conforming or equivalent to publicly known methods. For example, the silicon composite oxide containing the alkali metal ions or alkali earth metal ions may be treated with an ammonium salt solution whereby the alkali metal ions or alkali earth metal ions are exchanged for ammonium ions, followed by calcining at high temperature, resulting in having the alkali metal ions or alkali earth metal ions substituted with hydrogen ions.

The crystalline oxide (typically, zeolite) containing aluminosilicate or metallosilicate in which the alkali metal ions or alkali earth metal ions are substituted with hydrogen ions, which can be obtained by the ion exchange method described above, may be obtained, for example, by using a silica source such as fine powder silica, colloidal silica and tetraethoxysilane (TEOS); mixing this with a compound giving an alumina source such as metal aluminum, aluminum sulfate, aluminum nitrate and sodium aluminate, or with a compound giving a source of an oxide of the above-mentioned element such as iron, boron, titanium, phosphorus and gallium; and blending the mixture with an organic structure-directing agent such as a quaternary ammonium salt, and water, and subjecting the mixture to hydrothermal synthesis.

Where the silicon oxide used as the catalyst of the present invention contains aluminum, typically aluminosilicate, a $SiO_2/Al_2O_3$ molar ratio may be an arbitrary value, but is usually not less than 5, preferably not less than 10, and more preferably not less than 20, and is usually not more than 5,000, preferably not more than 3,000, and more preferably not more than 2,000. By the $SiO_2/Al_2O_3$ molar ratio falling within the range, an acid strength tends to be preferable for the reaction of producing higher silanes such as disilane. The $SiO_2/Al_2O_3$ molar ratio can be determined, for example, by fluorescent X-ray analysis.

As described above, the amount of hydrogen ions can be calculated by subtracting the total amount of alkali metal ions and alkali earth metal ions contained in aluminosilicate or metallosilicate from the total amount of ions necessary to compensate for the negative charge of the skeleton to keep electrical neutrality. As an example of a specific calculation, a case where ZSM-5 zeolite having a $SiO_2/Al_2O_3$ molar ratio of 1500 contains 0.01 wt % of Na will be considered: the amount of Al contained in 1 g of ZSM-5 zeolite is 83.8 micromole, which is the total amount of ions necessary to compensate for the negative charge of the skeleton to keep electrical neutrality; on the other hand, the amount of Na contained in 1 g of ZSM-5 zeolite is 4.3 micromole; accordingly, the amount of hydrogen ions contained in 1 g of ZSM-5 zeolite is calculated to be 79.5 micromole.

The porous oxide used as the catalyst of the present invention has a specific surface area, as determined by BET method (source: *Kyuchaku No Kagaku To Oyo* (Science and Application of Adsorption) authored by Yoshio ONO and Isao SUZUKI, edited by Kodansha Scientific Ltd.), which is preferably not less than 100 m$^2$/g, and more preferably not less than 200 m$^2$/g, and is preferably not more than 1,000 m$^2$/g, and more preferably not more than 800 m$^2$/g.

The porous oxide used as the catalyst of the present invention, in order to have further improved catalytic function or properties, may contain as needed, for example, an appropriate transition metal element having a catalytic function, such as platinum, palladium, ruthenium, rhodium, copper, silver, molybdenum, nickel, iron and cobalt, by a method such as ion exchange method and immersion method.

In the case where it is necessary for the porous oxide to be molded, the molding is possible by various ways conforming or equivalent to publicly known methods. An exemplary molding method is that the porous oxide is mixed with an appropriate binder, such as alumina, silica, silica alumina, zirconia, magnesia, titania and clay mineral, and the mixture obtained is subjected to e.g., extrusion molding. Another exemplary molding is that the porous oxide, without the use of any binders, is subjected to e.g., compression molding. The porous oxide, by undergoing such molding, can have appropriate size and shape, which can be adapted according to e.g., a mode or process of the reaction for producing a higher silane in the present invention.

(Production of Higher Silane)

The process for producing a higher silane of the present invention is a process in which a lower silane is brought into contact with the catalyst for producing a higher silane in order to convert the lower silane to a higher silane, which has more silicon than the lower silane.

As the lower silane, the raw material of a higher silane, an appropriate lower silane can be used as the raw material depending on a target higher silane. Examples of the lower silane used as the raw material are silanes such as monosilane, disilane and trisilane ($Si_nH_{2n+2}$; n is an integer of 1 or more). These silanes may be used singly, or a mixture of two or more kinds may be used. For example, where a target product (higher silane) is disilane, a raw material (lower silane) is monosilane. In the production process of the present invention, the lower silane used as the raw material may be used as it is without being diluted, or may be used after diluted with another diluting gas. The diluting gas used at the dilution is not particularly limited as long as being a gas inert to the lower silane, and is for example nitrogen, hydrogen, argon or helium. The concentration of the silane in the raw material gas is usually not less than 1 vol %, preferably not less than 10 vol %, and more preferably not less than 20 vol %, and is usually not more than 95 vol %, preferably not more than 90 vol %, and more preferably not more than 80 vol %. It is preferred for the concentration to be higher since a production apparatus can be compact. Considering more making a production apparatus compact, the lower silane may be present in the raw material gas at a concentration which is preferably not less than 50 vol % and preferably not more than 100 vol %. While systems using no catalysts involves the use of a raw material gas having hydrogen co-present in some cases in order to inhibit the precipitation of silicon, the need for hydrogen to be co-present in the raw material gas is not high in the present invention, and accordingly it is possible to improve productivity in terms of, e.g., downsize a production apparatus, and reduce production cost, as compared with the production process in the systems using no catalysts.

While in the production process of the present invention, the lower silane used as a raw material and the higher silane being a target product are not particularly limited, production processes preferred are (1) a process for producing disilane and trisilane from monosilane wherein the lower silane is monosilane and the higher silane is disilane and trisilane; (2) a process for producing disilane from monosilane wherein the lower silane is monosilane and the higher silane is disilane; and (3) a process for producing trisilane from disilane wherein the lower silane is disilane and the higher silane is trisilane.

The lower silane used as the raw material may contain impurities as long as they are inert to the reaction. Meanwhile, oxygen, carbon dioxide, carbon monoxide, nitrogen-containing compounds such as amine and nitrile, oxygen-containing compounds such as water, alcohol, aldehyde and ketone, olefins such as ethylene and acetylene, and phosphines have the potential to inhibit catalytic activity, and therefore their contents are preferably as low as possible.

In the production process of the present invention, the temperature at which the lower silane is brought into contact with the production catalyst is a temperature lower than a temperature at which the higher silane starts to be substantially produced through the thermal decomposition of the lower silane when conditions such as a pressure, a residence time, a concentration of the lower silane in a raw material gas, a reaction mode and the like are all equal except that no catalysts are used. According to the present invention, it is possible at such a low temperature to produce a higher silane from a lower silane. The temperature at which a lower silane is brought into contact with the production catalyst is usually not lower than 100° C., preferably not lower than 120° C., and more preferably not lower than 140° C., and is usually not higher than 400° C., preferably not higher than 350° C., more preferably not higher than 300° C., and still more preferably not higher than 250° C. At the temperature within the above ranges, there is neither insufficient conversion of the raw material lower silane due to excessively low temperature, nor obvious precipitation of solid silicon due to excessively high reaction temperature which causes the solid silicon to adhere or deposit on inner walls or pipes of a reactor thereby making stable operation difficult.

The reaction pressure, which may be any of reduced pressure, normal pressure and increased pressure, is preferably not lower than 0.1 MPaG and not higher than 1.0 MPaG. The reaction performed under the pressure which is increased to some degree is advantageous in terms of downsizing a reactor and accompanying devices. If the pressure is too high, however, the solid silicon readily occurs in some cases; and thus the reaction performed at a pressure of and not higher than 1.0 MPaG is preferred.

The reaction in the present invention may be performed in a reaction mode which is not particularly limited, the mode being any of batch, semi-batch and continuous modes. Usually, a continuous flowing mode of fixed-bed, fluidized bed, moving bed or the like is preferable.

In the fixed-bed mode, specifically, it is preferred that a gas including a lower silane such as monosilane is continuously allowed to flow through a tube-type reactor packed with the catalyst that has been appropriately molded as described above. One reactor alone may be used, or multiple reactors may be used, in which case each reactor may be connected in a serial way, in a parallel way or in a manner combining these ways. In this case, gas hourly space velocity (GHSV) is usually not less than 50 $hr^{-1}$, and preferably not less than 100 $hr^{-1}$, and is usually not more than 5,000 $hr^{-1}$, and preferably not more than 2,000 $hr^{-1}$. Within the above ranges, it is possible to prevent economical disadvantages: e.g., the increase in the amount of the catalyst used with respect to a production amount and the increase in the size of the reactor that are caused by excessively low gas hourly space velocity, as well as the increase in the cost for separating and collecting an unreacted raw material lower silane that is caused by low conversion arising from an excessively high gas hourly space velocity.

In the present invention, in the event that the conversion of lower silane is reduced by, e.g., the elapse of the reaction time, catalyst activation treatment may be performed to improve the conversion of a lower silane. The catalyst activation treatment may be performed after the catalyst is taken out from a reactor, or may be performed with the catalyst remaining in a reactor. Desirably, the catalyst activation treatment step is performed with the catalyst remaining in a reactor since the number of steps to be conducted can be simplified. While the way the catalyst activation treatment is performed is not particularly limited, it is preferred that the state where a lower silane or a mixture of a lower silane and a diluting gas such as hydrogen gas is flown is replaced by a state where the flowing of a lower silane is stopped and a gas containing hydrogen gas is flown. A gas to be flown at the catalyst activation treatment is preferably 100% of hydrogen gas, but as needed the gas diluted with an inert gas such as nitrogen and argon may be used. The temperature at the catalyst activation treatment is not particularly limited, but is preferably not lower than 20° C., more preferably not lower than 50° C., and still more preferably not lower than 100° C., and is preferably not higher than 600° C., more preferably not higher than 400° C., and still more preferably not higher than 300° C. The pressure at the catalyst activation treatment, which may be any of reduced pressure, normal pressure and increased pressure, is preferably not lower than 0.01 MPaG and not higher than 1.0 MPaG. The catalyst activation treatment improves the catalytic activity, resulting in prolonging the catalytic life.

In the present invention, a reactant gas discharged from a reactor used for the production of a higher silane from a lower silane may be subjected to known methods of cooling, distillation and like in order to be separated into a lower silane which has been unreacted and a higher silane which has been produced whereby that lower silane serving as a raw material of a higher silane is collected and recycled into the reactor for another use in the production of a higher silane. Recycling the lower silane makes it possible to provide a higher silane with high productivity.

Further, by performing the reaction using the higher silane which has been produced from a lower silane, again as a raw material, a higher silane is producible at a higher selectivity. For example, disilane is produced from monosilane which is a raw material, and thereafter with the disilane used as a raw material the reaction is performed again, so that a much higher silane such as trisilane can be selectively produced.

As described above, by recycling the silanes that have been produced, again as a raw material as in the present invention, production of any higher silanes is possible at high selectivity and high efficiency.

EXAMPLES

Hereinafter, the present invention will be further specifically described with reference to Examples, but in no way is the present invention limited to these examples.

Figure 1:
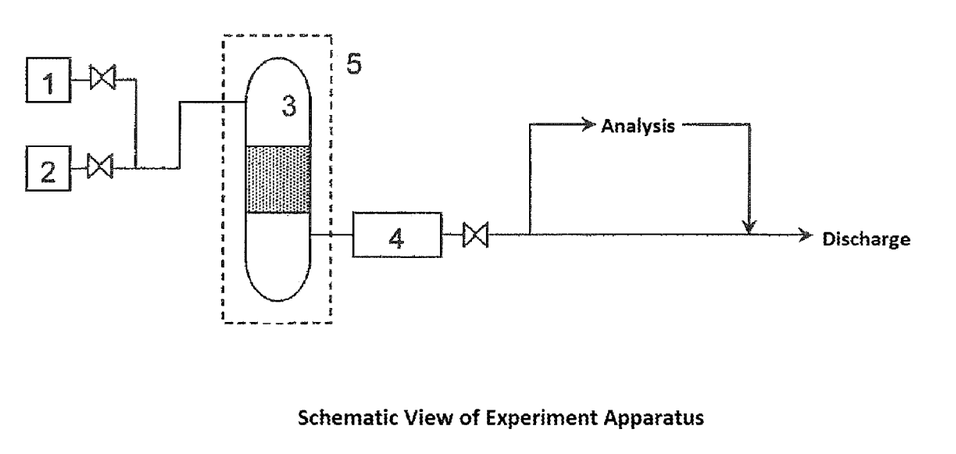
FIG. 1 shows a schematic view of an experiment apparatus.

An experiment apparatus used in the present invention is shown in FIG. 1. The catalyst was packed into the reactor, and the reactor was heated to a predetermined temperature in an electric furnace. A flow rate of a raw material gas was controlled with a mass flow meter.

A gas obtained in the reaction was on-line introduced to a gas chromatograph (manufactured by Shimadzu Corporation), where analysis for determining the concentrations of monosilane, disilane and trisilane was conducted. The gas chromatography was conducted in the following manner.
Analysis device: gas chromatograph GC-8A (manufactured by Shimadzu Corporation)
Column: Porapak-QS (manufactured by Waters), 1 meter in length, 3 mm in diameter
Residence time of substance to be analyzed (retention time): monosilane=7.5 min, disilane=12.5 min, trisilane=21.0 min
Carrier gas: helium (40 ml/min)
Column temperature: kept at 70° C. for 5 min, and thereafter elevated at 16° C./min to 180° C.
Inlet temperature: 200° C.
TCD detector temperature: 200° C.
TCD detector current: milliampere
The way the amounts of raw materials and products were determined:

From the results obtained by the gas chromatography, contents (mol %) of monosilane (MS), disilane (DS), trisilane (TS) that were contained in a reactant gas were determined. From an amount of MS supplied per unit time (mol/min) and contents of the individual components, an amount of DS produced through the reaction per unit time (mole number in terms of Si atom/min), an amount of TS produced through the reaction per unit time (mole number in terms of Si atom/min), and an amount of MS unreacted through the reaction and remaining (Mole number in terms of Si atom/min), were determined. In each case, higher silanes of tetra- or higher silanes were undetected.

From these values, when the raw material was monosilane, MS conversion (mol %), DS selectivity (mol %) and TS selectivity (mol %) were determined in the following manner.

MS conversion (mol %)=(amount of DS produced (mol)×2+amount of TS produced (mol)×3)/ amount of MS supplied (mol)

DS selectivity (mol %)=amount of DS produced (mol)×2/(amount of DS produced (mol)×2+ amount of TS produced (mol)×3)

TS selectivity (mol %)=amount of TS produced (mol)×3/(amount of DS produced (mol)×2+ amount of TS produced (mol)×3)

When the raw material was disilane, DS conversion (mol %) was determined in the following manner.

DS conversion (mol %)=(amount of TS produced (mol)×3)/(amount of DS fed (mol)×2)

Example 1

45 cc of mordenite ($SiO_2/Al_2O_3$ molar ratio=18, Na content [wt %]=0.04, alkali metals excluding Na and alkali earth metals were below detection limit, pore diameter=0.48 nm, 0.57 nm (falling in the range of from 0.4 nm to 0.6 nm), shape: 1.5 mm pellet, binder type: alumina) was packed into a reaction tube having an inner diameter of 8 mm, and heated at 400° C. under the flow of nitrogen, whereby catalyst pre-treatment was performed. A mixture gas of monosilane gas and hydrogen gas (monosilane concentration: 80 vol %) was introduced into the reactor such that the gas hourly space velocity was 140 $h^{-1}$, and the reaction was performed at 200° C., at 0.12 MPaG. Ten hours after, a reaction product was on-line introduced to the gas chromatograph GC-8A (manufactured by Shimadzu Corporation), to determine contents of monosilane, disilane and trisilane. From these values, MS conversion was 1.06 (mol %). Precipitation of solid silicon on wall surfaces of the reaction tube was not visually observed. A result thereof is shown in Table 1.

Example 2

The same reaction as in Example 1 was performed except that the reaction temperature was 250° C. In the same manner as in Example 1, a reaction product was on-line introduced to the gas chromatograph, to determine contents of monosilane, disilane and trisilane. The amount of trisilane produced was below detection lower limit. Precipitation of solid silicon on wall surfaces of the reaction tube was not visually observed. MS conversion was 1.88 (mol %). A result thereof is shown in Table 1.

Example 3

The same reaction as in Example 1 was performed except that the catalyst of Example 1 was replaced by ZSM-5 ($SiO_2/Al_2O_3$ molar ratio=23, Na content [wt %]=0.01, alkali metals excluding Na and alkali earth metals were below detection limit, pore diameter=0.51 nm, 0.53 nm, 0.55 nm, 0.56 nm (falling in the range of from 0.4 nm to 0.6 nm), shape: 3 mm pellet, binder type: alumina). In the same manner as in Example 1, a reaction product was on-line introduced to the gas chromatograph, to determine contents of monosilane, disilane and trisilane. The amount of trisilane produced was below detection lower limit. Precipitation of solid silicon on wall surfaces of the reaction tube was not visually observed. MS conversion was 0.93 (mol %). A result thereof is shown in Table 1.

Example 4

The same reaction as in Example 3 was performed except that the reaction temperature was 250° C. In the same manner as in Example 1, a reaction product was on-line introduced to the gas chromatograph, to determine contents of monosilane, disilane and trisilane. The amount of trisilane produced was below detection lower limit. Precipitation of solid silicon on wall surfaces of the reaction tube was not visually observed. MS conversion was 4.20 (mol %). A result thereof is shown in Table 1.

Example 5

The same reaction as in Example 1 was performed except that the catalyst of Example 1 was replaced by ZSM-5 having properties different from Examples 3 and 4 ($SiO_2/Al_2O_3$ molar ratio=1500, Na content [wt %]=0.01, alkali metals excluding Na and alkali earth metals were below detection limit, pore diameter=0.51 nm, 0.53 nm, 0.55 nm, 0.56 nm (falling in the range of from 0.4 nm to 0.6 nm), shape: 1.5 mm pellet, binder type: alumina), and that the reaction temperature was 150° C. In the same manner as in Example 1, a reaction product was on-line introduced to the gas chromatograph, to determine contents of monosilane, disilane and trisilane. The amount of trisilane produced was below detection lower limit. Precipitation of solid silicon on wall surfaces of the reaction tube was not visually observed. MS conversion was 2.97 (mol %). A result thereof is shown in Table 1.

Example 6

The same reaction as in Example 5 was performed except that the reaction temperature was 200° C. In the same manner as in Example 1, a reaction product was on-line introduced to the gas chromatograph, to determine contents of monosilane, disilane and trisilane. The amount of trisilane produced was below detection lower limit. Precipitation of solid silicon on wall surfaces of the reaction tube was not visually observed. MS conversion was 6.79 (mol %). A result thereof is shown in Table 1.

Example 7

The same reaction as in Example 1 was performed except that the catalyst of Example 1 was replaced by β-type ($SiO_2/Al_2O_3$ molar ratio=500, Na content [wt %]=0.07, alkali metals excluding Na and alkali earth metals were below detection limit, pore diameter=0.56 nm (falling in the range of from 0.4 nm to 0.6 nm), shape: 1.5 mm pellet, binder type: clay). In the same manner as in Example 1, a reaction product was on-line introduced to the gas chromatograph, to determine contents of monosilane, disilane and trisilane. The amount of trisilane produced was below detection lower limit. Precipitation of solid silicon on wall surfaces of the reaction tube was not visually observed. MS conversion was 1.74 (mol %). A result thereof is shown in Table 1.

Example 8

The same reaction as in Example 7 was performed except that the reaction temperature was 250° C. In the same manner as in Example 1, a reaction product was on-line introduced to the gas chromatograph, to determine contents of monosilane, disilane and trisilane. The amount of trisilane produced was below detection lower limit. Precipitation of solid silicon on wall surfaces of the reaction tube was not visually observed. MS conversion was 2.15 (mol %). A result thereof is shown in Table 1.

Example 9

The same reaction as in Example 1 was performed except that the catalyst of Example 1 was replaced by ZSM-5 having properties different from Examples 3 and 4 ($SiO_2/Al_2O_3$ molar ratio=80, Na content [wt %]=0.01, alkali metals excluding Na and alkali earth metals were below detection limit, pore diameter=0.51 nm, 0.53 nm, 0.55 nm, 0.56 nm (falling in the range of from 0.4 nm to 0.6 nm), shape: 1.5 mm pellet, binder type: alumina), and that the reaction temperature was 150° C. In the same manner as in Example 1, a reaction product was on-line introduced to the gas chromatograph, to determine contents of monosilane, disilane and trisilane. MS conversion was 2.23 (mol %). Precipitation of solid silicon on wall surfaces of the reaction tube was not visually observed. A result thereof is shown in Table 2.

Example 10

The same reaction as in Example 9 was performed except that the reaction temperature was 200° C. In the same manner as in Example 1, a reaction product was on-line introduced to the gas chromatograph, to determine contents of monosilane, disilane and trisilane. MS conversion was 6.21 (mol %). Precipitation of solid silicon on wall surfaces of the reaction tube was not visually observed. A result thereof is shown in Table 2.

Example 11

The same reaction as in Example 1 was performed except that the catalyst of Example 1 was replaced by ZSM-5 having properties different from Examples 3 and 4 ($SiO_2/Al_2O_3$ molar ratio=280, Na content [wt %]=0.01, alkali metals excluding Na and alkali earth metals were below detection limit, pore diameter=0.51 nm, 0.53 nm, 0.55 nm, 0.56 nm (falling in the range of from 0.4 nm to 0.6 nm), shape: 1.5 mm pellet, binder type: alumina), and that the reaction temperature was 150° C. In the same manner as in Example 1, a reaction product was on-line introduced to the gas chromatograph, to determine contents of monosilane, disilane and trisilane. MS conversion was 2.89 (mol %). Precipitation of solid silicon on wall surfaces of the reaction tube was not visually observed. A result thereof is shown in Table 2.

TABLE 1

| | Catalyst | | | | Reaction conditions | | | | | Reaction performance | |
| --- | --- | --- | --- | --- | --- | --- | --- | --- | --- | --- | --- |
| Number | Catalyst | $SiO_2/Al_2O_3$ ratio | Na content | Pore diameter/ nm | Catalyst amount/ cc | Reaction temperature/ ° C. | Gas hourly space velocity/$h^{-1}$ | Pressure/ MPaG | MS concentration/ vol % | MS conversion/ mol % | Precipitation of solid silicon |
| Example 1 | Mordenite | 18 | 0.04 | 0.48 0.57 | 45 | 200 | 140 | 0.12 | 80 | 1.06 | None |
| Example 2 | Mordenite | 18 | 0.04 | 0.48 0.57 | 45 | 250 | 140 | 0.12 | 80 | 1.88 | None |
| Example 3 | ZSM-5 | 23 | 0.01 | 0.51, 0.53 0.55, 0.56 | 45 | 200 | 140 | 0.12 | 80 | 0.93 | None |
| Example 4 | ZSM-5 | 23 | 0.01 | 0.51, 0.53 0.55, 0.56 | 45 | 250 | 140 | 0.12 | 80 | 4.20 | None |
| Example 5 | ZSM-5 | 1500 | 0.01 | 0.51, 0.53 0.55, 0.56 | 45 | 150 | 140 | 0.12 | 80 | 2.97 | None |
| Example 6 | ZSM-5 | 1500 | 0.01 | 0.51, 0.53 0.55, 0.56 | 45 | 200 | 140 | 0.12 | 80 | 6.79 | None |
| Example 7 | β-type | 500 | 0.07 | 0.56 | 45 | 200 | 140 | 0.12 | 80 | 1.74 | None |
| Example 8 | β-type | 500 | 0.07 | 0.56 | 45 | 250 | 140 | 0.12 | 80 | 2.15 | None |

Example 12

The same reaction as in Example 11 was performed except that the reaction temperature was 200° C. In the same manner as in Example 1, a reaction product was on-line introduced to the gas chromatograph, to determine contents of monosilane, disilane and trisilane. MS conversion was 6.81 (mol %). Precipitation of solid silicon on wall surfaces of the reaction tube was not visually observed. A result thereof is shown in Table 2.

Example 13

The same reaction as in Example 1 was performed except that the catalyst of Example 1 was replaced by ZSM-5 having properties different from Examples 3 and 4 ($SiO_2/Al_2O_3$ molar ratio=280, Na content [wt %]=0.01, alkali metals excluding Na and alkali earth metals were below detection limit, pore diameter=0.51 nm, 0.53 nm, 0.55 nm, 0.56 nm (falling in the range of from 0.4 nm to 0.6 nm), shape: 1.5 mm pellet, binder type: alumina), and that the reaction temperature was 150° C. In the same manner as in Example 1, a reaction product was on-line introduced to the gas chromatograph, to determine contents of monosilane, disilane and trisilane. MS conversion was 3.02 (mol %). Precipitation of solid silicon on wall surfaces of the reaction tube was not visually observed. A result thereof is shown in Table 2.

Example 14

The same reaction as in Example 13 was performed except that the reaction temperature was 200° C. In the same manner as in Example 1, a reaction product was on-line introduced to the gas chromatograph, to determine contents of monosilane, disilane and trisilane. MS conversion was 6.94 (mol %). Precipitation of solid silicon on wall surfaces of the reaction tube was not visually observed. A result thereof is shown in Table 2.

whereby catalyst pre-treatment was performed. A mixture gas of monosilane gas and hydrogen gas (monosilane concentration: 80 vol %) was introduced into the reactor such that the gas hourly space velocity was 467 $h^{-1}$, and the reaction was performed at 150° C., at 0.2 MPaG. A reaction product was on-line introduced to the gas chromatograph GC-8A (manufactured by Shimadzu Corporation), to determine contents of monosilane, disilane and trisilane. Precipitation of solid silicon on wall surfaces of the reaction tube was not visually observed. From these values, it was determined that MS conversion was 2.37 (mol %), DS selectivity was 88.9 (mol %), and TS selectivity was 11.1 (mol %). A result thereof is shown in Table 3.

Example 16

The same reaction as in Example 15 was performed except that the reaction temperature was 200° C. In the same manner as in Example 15, a reaction product was on-line introduced to the gas chromatograph GC-8A (manufactured by Shimadzu Corporation), to determine contents of monosilane, disilane and trisilane. Precipitation of solid silicon on wall surfaces of the reaction tube was not visually observed. From these values, it was determined that MS conversion was 4.28 (mol %), DS selectivity was 84.1 (mol %), and TS selectivity was 15.9 (mol %). A result thereof is shown in Table 3.

Example 17

6.4 cc of ZSM-5 ($SiO_2/Al_2O_3$ molar ratio=1500, Na content [wt %]=0.01, alkali metals excluding Na and alkali earth metals were below detection limit, pore diameter=0.51 nm, 0.53 nm, 0.55 nm, 0.56 nm (falling in the range of from 0.4 nm to 0.6 nm), shape: 3 mm pellet, binder type: alumina) were packed into a reaction tube of having an inner diameter of 8 mm, and heated at 200° C. under the flow of nitrogen, whereby catalyst pre-treatment was performed. A mixture gas of monosilane gas and hydrogen gas (monosilane con-

TABLE 2

| Number | Catalyst | | | | Reaction conditions | | | | | Reaction performance | |
|---|---|---|---|---|---|---|---|---|---|---|---|
| | Catalyst | $SiO_2/Al_2O_3$ ratio | Na content | Pore diameter/ nm | Catalyst amount/ cc | Reaction temperature/ ° C. | Gas hourly space velocity/$h^{-1}$ | Pressure/ MPaG | MS concentration/ vol % | MS conversion/ mol % | Precipitation of solid silicon |
| Example 9 | ZSM-5 | 80 | 0.01 | 0.51, 0.53 0.55, 0.56 | 45 | 150 | 140 | 0.12 | 80 | 2.23 | None |
| Example 10 | ZSM-5 | 80 | 0.01 | 0.51, 0.53 0.55, 0.56 | 45 | 200 | 140 | 0.12 | 80 | 6.21 | None |
| Example 11 | ZSM-5 | 280 | 0.01 | 0.51, 0.53 0.55, 0.56 | 45 | 150 | 140 | 0.12 | 80 | 2.89 | None |
| Example 12 | ZSM-5 | 280 | 0.01 | 0.51, 0.53 0.55, 0.56 | 45 | 200 | 140 | 0.12 | 80 | 6.81 | None |
| Example 13 | ZSM-5 | 500 | 0.01 | 0.51, 0.53 0.55, 0.56 | 45 | 150 | 140 | 0.12 | 80 | 3.02 | None |
| Example 14 | ZSM-5 | 500 | 0.01 | 0.51, 0.53 0.55, 0.56 | 45 | 200 | 140 | 0.12 | 80 | 6.94 | None |

Example 15

6.4 cc of ZSM-5 ($SiO_2/Al_2O_3$ molar ratio=1500, Na content [wt %]=0.01, alkali metals excluding Na and alkali earth metals were below detection limit, pore diameter=0.51 nm, 0.53 nm, 0.55 nm, 0.56 nm (falling in the range of from 0.4 nm to 0.6 nm), shape: 3 mm pellet, binder type: alumina) was packed into a reaction tube having an inner diameter of 8 mm, and heated at 400° C. under the flow of nitrogen, centration: 80 vol %) was introduced into the reactor such that the gas hourly space velocity was 467 $h^{-1}$, and the reaction was performed at 150° C., at 0.2 MPaG. A reaction product was on-line introduced to the gas chromatograph GC-8A (manufactured by Shimadzu Corporation), to determine contents of monosilane, disilane and trisilane. Precipitation of solid silicon on wall surfaces of the reaction tube was not visually observed. From these values, it was determined that MS conversion was 2.35 (mol %), DS selectivity was 88.6 (mol %), and TS selectivity was 11.5 (mol %). A result thereof is shown in Table 3.

Example 18

The same reaction as in Example 17 was performed except that the reaction temperature was 200° C. In the same manner as in Example 17, a reaction product was on-line introduced to the gas chromatograph GC-8A (manufactured by Shimadzu Corporation), to determine contents of monosilane, disilane and trisilane. Precipitation of solid silicon on wall surfaces of the reaction tube was not visually observed. From these values, it was determined that MS conversion was 4.33 (mol %), DS selectivity was 84.2 (mol %), and TS selectivity was 15.9 (mol %). A result thereof is shown in Table 3.

Example 19

The same reaction as in Example 17 was performed except that the reaction pressure was 0.3 MPaG. In the same manner as in Example 17, a reaction product was on-line introduced to the gas chromatograph GC-8A (manufactured by Shimadzu Corporation), to determine contents of monosilane, disilane and trisilane. Precipitation of solid silicon on wall surfaces of the reaction tube was not visually observed. From these values, it was determined that MS conversion was 2.28 (mol %), DS selectivity was 89.3 (mol %), and TS selectivity was 10.7 (mol %). A result thereof is shown in Table 3.

Example 20

The same reaction as in Example 19 was performed except that the reaction temperature was 200° C. In the same manner as in Example 17, a reaction product was on-line introduced to the gas chromatograph GC-8A (manufactured by Shimadzu Corporation), to determine contents of monosilane, disilane and trisilane. Precipitation of solid silicon on wall surfaces of the reaction tube was not visually observed. From these values, it was determined that MS conversion was 4.70 (mol %), DS selectivity was 83.0 (mol %), and TS selectivity was 17.0 (mol %). A result thereof is shown in Table 3.

Example 21

The same reaction as in Example 17 was performed except that the reaction pressure was 0.4 MPaG. In the same manner as in Example 17, a reaction product was on-line introduced to the gas chromatograph GC-8A (manufactured by Shimadzu Corporation), to determine contents of monosilane, disilane and trisilane. Precipitation of solid silicon on wall surfaces of the reaction tube was not visually observed. From these values, it was determined that MS conversion was 2.41 (mol %), DS selectivity was 89.0 (mol %), and TS selectivity was 11.0 (mol %). A result thereof is shown in Table 3.

Example 22

The same reaction as in Example 21 was performed except that the reaction temperature was 200° C. In the same manner as in Example 21, a reaction product was on-line introduced to the gas chromatograph GC-8A (manufactured by Shimadzu Corporation), to determine contents of monosilane, disilane and trisilane. Precipitation of solid silicon on wall surfaces of the reaction tube was not visually observed. From these values, it was determined that MS conversion was 4.93 (mol %), DS selectivity was 82.0 (mol %), and TS selectivity was 18.0 (mol %). A result thereof is shown in Table 3.

Example 23

The same reaction as in Example 17 was performed except that the monosilane concentration was 95%. In the same manner as in Example 17, a reaction product was on-line introduced to the gas chromatograph GC-8A (manufactured by Shimadzu Corporation), to determine contents of monosilane, disilane and trisilane. Precipitation of solid silicon on wall surfaces of the reaction tube was not visually observed. From these values, it was determined that MS conversion was 1.80 (mol %), DS selectivity was 91.5 (mol %), and TS selectivity was 8.5 (mol %). A result thereof is shown in Table 3.

Example 24

The same reaction as in Example 23 was performed except that the reaction temperature was 200° C. In the same manner as in Example 23, a reaction product was on-line introduced to the gas chromatograph GC-8A (manufactured by Shimadzu Corporation), to determine contents of monosilane, disilane and trisilane. Precipitation of solid silicon on wall surfaces of the reaction tube was not visually observed. From these values, it was determined that MS conversion was 3.88 (mol %), DS selectivity was 85.6 (mol %), and TS selectivity was 14.4 (mol %). A result thereof is shown in Table 3.

Example 25

The same reaction as in Example 17 was performed except that the monosilane concentration was 100%. In the same manner as in Example 17, a reaction product was on-line introduced to the gas chromatograph GC-8A (manufactured by Shimadzu Corporation), to determine contents of monosilane, disilane and trisilane. Precipitation of solid silicon on wall surfaces of the reaction tube was not visually observed. From these values, it was determined that MS conversion was 1.67 (mol %), DS selectivity was 92.1 (mol %), and TS selectivity was 7.9 (mol %). A result thereof is shown in Table 3.

Example 26

The same reaction as in Example 25 was performed except that the reaction temperature was 200° C. In the same manner as in Example 25, a reaction product was on-line introduced to the gas chromatograph GC-8A (manufactured by Shimadzu Corporation), to determine contents of monosilane, disilane and trisilane. Precipitation of solid silicon on wall surfaces of the reaction tube was not visually observed. From these values, it was determined that MS conversion was 3.72 (mol %), DS selectivity was 85.8 (mol %), and TS selectivity was 14.2 (mol %). A result thereof is shown in Table 3.

Example 27

The same reaction as in Example 17 was performed except that the gas hourly space velocity was 233 h$^{-1}$. In the same manner as in Example 17, a reaction product was on-line introduced to the gas chromatograph GC-8A (manufactured by Shimadzu Corporation), to determine contents of monosilane, disilane and trisilane. Precipitation of solid silicon on wall surfaces of the reaction tube was not visually observed. From these values, it was determined that MS conversion was 2.34 (mol %), DS selectivity was 89.3 (mol %), and TS selectivity was 10.7 (mol %). A result thereof is shown in Table 3.

Example 28

The same reaction as in Example 27 was performed except that the reaction temperature was 200° C. In the same manner as in Example 27, a reaction product was on-line introduced to the gas chromatograph GC-8A (manufactured by Shimadzu Corporation), to determine contents of monosilane, disilane and trisilane. Precipitation of solid silicon on wall surfaces of the reaction tube was not visually observed. From these values, it was determined that MS conversion was 5.52 (mol %), DS selectivity was 80.8 (mol %), and TS selectivity was 19.2 (mol %). A result thereof is shown in Table 3.

Example 29

Experiment to See Life of Production Catalyst 6.4 cc of ZSM-5 ($SiO_2/Al_2O_3$ molar ratio=1500, Na content [wt %]=0.01, alkali metals excluding Na and alkali earth metals were below detection limit, pore diameter=0.51 nm, 0.53 nm, 0.55 nm, 0.56 nm (falling in the range of from 0.4 nm to 0.6 nm), shape: 3 mm pellet, binder type: alumina) was packed into a reaction tube having an inner diameter of 8 mm, and heated at 200° C. under the flow of nitrogen, whereby catalyst pre-treatment was performed. A mixture gas of monosilane gas and hydrogen gas (monosilane concentration: 80 vol %) was introduced into the reactor such that the gas hourly space velocity was 467 $h^{-1}$, and the reaction was performed at 180° C. at 0.4 MPaG. A reaction product given 10 hours after starting the reaction was on-line introduced to the gas chromatograph GC-8A (manufactured

TABLE 3

| Number | Catalyst | $SiO_2/Al_2O_3$ ratio | Na content | Pore diameter/ nm | Catalyst amount/ cc | Reaction temperature/ ° C. | Gas hourly space velocity/$h^{-1}$ |
|---|---|---|---|---|---|---|---|
| Example 15 | ZSM-5 | 1500 | 0.01 | 0.51, 0.53 0.55, 0.56 | 6.4 | 150 | 467 |
| Example 16 | ZSM-5 | 1500 | 0.01 | 0.51, 0.53 0.55, 0.56 | 6.4 | 200 | 467 |
| Example 17 | ZSM-5 | 1500 | 0.01 | 0.51, 0.53 0.55, 0.56 | 6.4 | 150 | 467 |
| Example 18 | ZSM-5 | 1500 | 0.01 | 0.51, 0.53 0.55, 0.56 | 6.4 | 200 | 467 |
| Example 19 | ZSM-5 | 1500 | 0.01 | 0.51, 0.53 0.55, 0.56 | 6.4 | 150 | 467 |
| Example 20 | ZSM-5 | 1500 | 0.01 | 0.51, 0.53 0.55, 0.56 | 6.4 | 200 | 467 |
| Example 21 | ZSM-5 | 1500 | 0.01 | 0.51, 0.53 0.55, 0.56 | 6.4 | 150 | 467 |
| Example 22 | ZSM-5 | 1500 | 0.01 | 0.51, 0.53 0.55, 0.56 | 6.4 | 200 | 467 |
| Example 23 | ZSM-5 | 1500 | 0.01 | 0.51, 0.53 0.55, 0.56 | 6.4 | 150 | 467 |
| Example 24 | ZSM-5 | 1500 | 0.01 | 0.51, 0.53 0.55, 0.56 | 6.4 | 200 | 467 |
| Example 25 | ZSM-5 | 1500 | 0.01 | 0.51, 0.53 0.55, 0.56 | 6.4 | 150 | 467 |
| Example 26 | ZSM-5 | 1500 | 0.01 | 0.51, 0.53 0.55, 0.56 | 6.4 | 200 | 467 |
| Example 27 | ZSM-5 | 1500 | 0.01 | 0.51, 0.53 0.55, 0.56 | 6.4 | 150 | 233 |
| Example 28 | ZSM-5 | 1500 | 0.01 | 0.51, 0.53 0.55, 0.56 | 6.4 | 200 | 233 |

| Number | Pressure/ MPaG | MS concentration/ vol % | MS conversion/ mol % | DS selectivity/ mol % | TS selectivity/ mol % | Precipitation of solid silicon |
|---|---|---|---|---|---|---|
| Example 15 | 0.2 | 80 | 2.37 | 88.9 | 11.1 | None |
| Example 16 | 0.2 | 80 | 4.28 | 84.1 | 15.9 | None |
| Example 17 | 0.2 | 80 | 2.35 | 88.6 | 11.5 | None |
| Example 18 | 0.2 | 80 | 4.33 | 84.2 | 15.9 | None |
| Example 19 | 0.3 | 80 | 2.28 | 89.3 | 10.7 | None |
| Example 20 | 0.3 | 80 | 4.70 | 83.0 | 17.0 | None |
| Example 21 | 0.4 | 80 | 2.41 | 89.0 | 11.0 | None |
| Example 22 | 0.4 | 80 | 4.93 | 82.0 | 18.0 | None |
| Example 23 | 0.2 | 95 | 1.80 | 91.5 | 8.5 | None |
| Example 24 | 0.2 | 95 | 3.88 | 85.6 | 14.4 | None |
| Example 25 | 0.2 | 100 | 1.67 | 92.1 | 7.9 | None |
| Example 26 | 0.2 | 100 | 3.72 | 85.8 | 14.2 | None |
| Example 27 | 0.2 | 80 | 2.34 | 89.3 | 10.7 | None |
| Example 28 | 0.2 | 80 | 5.52 | 80.8 | 19.2 | None | by Shimadzu Corporation), to determine contents of monosilane, disilane and trisilane, and it was found that MS conversion was 4.26 (mol %), DS selectivity was 82.1 (mol %), and TS selectivity was 17.9 (mol %). The reaction was continued, and a reaction product given 200 hours after starting the reaction was on-line introduced to the gas chromatograph GC-8A (manufactured by Shimadzu Corporation), to determine contents of monosilane, disilane and trisilane, and it was found that MS conversion was 2.32 (mol %), DS selectivity was 89.3 (mol %), and TS selectivity was 10.7 (mol %). A result thereof is shown in Table 4.

Example 30

Experiment to See Regeneration of Production Catalyst 200 hours after starting the reaction, indicated in Example 29, the supplying of monosilane was stopped, and with hydrogen gas alone flown, catalyst activation treatment was carried out for 3 hours under normal pressure at 180° C. After the catalyst activation treatment, the reaction was performed under the same conditions as in Example 29. A reaction product given 1 hour after resuming the reaction was on-line introduced to the gas chromatograph GC-8A (manufactured by Shimadzu Corporation), to determine contents of monosilane, disilane and trisilane, and it was found that MS conversion was 3.77 (mol %), DS selectivity was 84.8 (mol %), and TS selectivity was 15.2 (mol %). Again, the supplying of monosilane was stopped, and with hydrogen gas alone flown, the catalyst activation treatment was carried out for 72 hours under normal pressure at 180° C. After the catalyst activation treatment, the reaction was performed under the same conditions as in Example 29. A reaction product given 1 hour after resuming the reaction was on-line introduced to the gas chromatograph GC-8A (manufactured by Shimadzu Corporation), to determine contents of monosilane, disilane and trisilane, and it was found that MS conversion was 4.24 (mol %), DS selectivity was 81.5 (mol %), and TS selectivity was 18.5 (mol %). A result thereof is shown in Table 4.

limit, pore diameter=0.48 nm, 0.57 nm (falling in the range of from 0.4 nm to 0.6 nm), shape: 1.2 mm pellet, binder type: clay), and the reaction was performed in the same manner as in Example 1. In the same manner as in Example 1, a reaction product was on-line introduced to the gas chromatograph, to determine contents of monosilane, disilane and trisilane. The amount of trisilane produced was below detection lower limit. Precipitation of solid silicon on wall surfaces of the reaction tube was not visually observed. MS conversion was 0.07 (mol %), DS selectivity was 100 (mol %), and TS selectivity was 0 (mol %). As is clear from the above result, conversion of monosilane was considerably lower than Example 1, where the reaction conditions were the same using the same mordenite as in Comparative Example 1 except that sodium ions contained in the mordenite used in Example 1 were replaced with hydrogen ions. A result thereof is shown in Table 5.

Comparative Example 2

The same reaction as in Comparative Example 1 was performed except that the reaction temperature was 250° C. In the same manner as in Example 1, a reaction product was on-line introduced to the gas chromatograph, to determine contents of monosilane, disilane and trisilane. The amount of trisilane produced was below detection lower limit. Precipitation of solid silicon on wall surfaces of the reaction tube was not visually observed. MS conversion was 0.13 (mol %), DS selectivity was 100 (mol %), and TS selectivity was 0 (mol %). As is clear from the above result, conversion of monosilane was considerably lower than Example 1, where the reaction conditions were the same using the same mordenite as in Comparative Example 1 except that sodium ions contained in the mordenite used in Example 1 were replaced with hydrogen ions. A result thereof is shown in Table 5.

Comparative Example 3

Using γ-alumina (FD-24, manufactured by Sumika Alchem Co., Ltd.; 2 to 4 mm spherical shape, BET specific surface area=330 m²/g), the reaction was performed in the same manner as in Example 1. In the same manner as in Example 1, a reaction product was on-line introduced to the gas chromatograph, to determine contents of monosilane, disilane and trisilane. The amount of trisilane produced was below detection lower limit. Precipitation of solid silicon on

TABLE 4

| Number | Catalyst | | | | Reaction conditions | | |
|---|---|---|---|---|---|---|---|
| | Catalyst | SiO$_2$/Al$_2$O$_3$ ratio | Na content | Pore diameter/ nm | Catalyst amount/ cc | Reaction temperature/ ° C. | Gas hourly space velocity/ h$^{-1}$ |
| Example 29 | ZSM-5 | 1500 | 0.01 | 0.51, 0.53 0.55, 0.56 | 6.4 | 180 | 467 |
| Example 30 | ZSM-5 | 1500 | 0.01 | 0.51, 0.53 0.55, 0.56 | 6.4 | 180 | 467 |

| Number | Reaction conditions | | Reaction performance | | | |
|---|---|---|---|---|---|---|
| | Pressure/ MPaG | MS concentration/ vol % | MS conversion/ mol % | DS selectivity/ mol % | TS selectivity/ mol % | |
| Example 29 | 0.4 | 80 | 4.26 | 82.1 | 17.9 | 10 hours after |
| | | | 2.32 | 89.3 | 10.7 | 200 hours after |
| Example 30 | 0.4 | 80 | 3.77 | 84.8 | 15.3 | 1 hour after |
| | | | 4.24 | 81.5 | 18.5 | 72 hours after |

Comparative Example 1

The catalyst of Example 1 was replaced by mordenite having properties different from Example 1 (SiO$_2$/Al$_2$O$_3$ molar ratio=18, Na content [wt %]=3.7, alkali metals excluding Na and alkali earth metals were below detection wall surfaces of the reaction tube was not visually observed. MS conversion was 0.15 (mol %), DS selectivity was 100 (mol %), and TS selectivity was 0 (mol %). As is clear from the above result, conversion of monosilane was considerably lower than Examples 1, 3, 6 and 7, where the reaction was performed under the same conditions. A result thereof is shown in Table 5.

Reference Example 1

The same reaction as in Example 1 was performed except that the catalyst was not packed, and that the reaction temperature was 350° C., 375° C., 400° C. and 425° C. In the same manner as in Example 1, a reaction product was on-line introduced to the gas chromatograph, to determine contents of monosilane, disilane and trisilane. At not higher than 300° C., the conversion of monosilane was not observed at all, and a high temperature of 350° C. was needed to produce disilane. At a temperature of not lower than 400° C., the production of trisilane was observed, and precipitation of solid silicon on wall surfaces of the reaction tube was observed. At the reaction temperature of 350° C., MS conversion was 0.04 (mol %), DS selectivity was 100 (mol %), and TS selectivity was 0 (mol %). At the reaction temperature of 375° C., MS conversion was 0.25 (mol %), DS selectivity was 100 (mol %), and TS selectivity was 0 (mol %). At the reaction temperature of 400° C., MS conversion was 1.13 (mol %), DS selectivity was 89.0 (mol %), and TS selectivity was 10.8 (mol %). At the reaction temperature of 425° C., MS conversion was 4.75 (mol %), DS selectivity was 82.6 (mol %), and TS selectivity was 17.2 (mol %). A result thereof is shown in Table 5.

Reference Example 2

Using Y-type zeolite ($SiO_2/Al_2O_3$ molar ratio=6, Na content [wt %]=0.01, alkali metals excluding Na and alkali earth metals were below detection limit, pore diameter=0.74 nm, shape: 1.5 mm pellet, binder type: alumina), the same reaction as in Example 15 was performed. In the same manner as in Example 15, a reaction product was on-line introduced to the gas chromatograph, to determine contents of monosilane, disilane and trisilane, and it was found that MS conversion was 0.26 (mol %). Precipitation of solid silicon on wall surfaces of the reaction tube was not visually observed. A result thereof is shown in Table 5.

Reference Example 3

The same reaction as in Reference Example 2 was performed except that the reaction temperature was 200° C. In the same manner as in Reference Example 2, a reaction product was on-line introduced to the gas chromatograph, to determine contents of monosilane, disilane and trisilane, and it was found that MS conversion was 0.48 (mol %). Precipitation of solid silicon on wall surfaces of the reaction tube was not visually observed. A result thereof is shown in Table 5.

Reference Example 4

The same reaction as in Reference Example 2 was performed except that the reaction temperature was 250° C. In the same manner as in Reference Example 2, a reaction product was on-line introduced to the gas chromatograph, to determine contents of monosilane, disilane and trisilane, and it was found that MS conversion was 0.89 (mol %). Precipitation of solid silicon on wall surfaces of the reaction tube was not visually observed. A result thereof is shown in Table 5.

TABLE 5

| Number | Catalyst | $SiO_2/Al_2O_3$ ratio | Na content | Pore diameter/ nm | Catalyst amount/ cc | Reaction temperature/ ° C. | Gas hourly space velocity/$h^{-1}$ |
|---|---|---|---|---|---|---|---|
| Comparative Example 1 | Mordenite | 18 | 3.7 | 0.48 0.57 | 45 | 200 | 140 |
| Comparative Example 2 | Mordenite | 18 | 3.7 | 0.48 0.57 | 45 | 250 | 140 |
| Comparative Example 3 | γ-$Al_2O_3$ | — | — | — | 45 | 200 | 140 |
| Reference Example 1 | No catalysts | — | — | — | 0 | 350 | — |
|  |  | — | — | — | 0 | 375 | — |
|  |  | — | — | — | 0 | 400 | — |
|  |  | — | — | — | 0 | 425 | — |
| Reference Example 2 | Y-type zeolite | 6 | 0.01 | 0.74 | 6.4 | 150 | 467 |
| Reference Example 3 | Y-type zeolite | 6 | 0.01 | 0.74 | 6.4 | 200 | 467 |
| Reference Example 4 | Y-type zeolite | 6 | 0.01 | 0.74 | 6.4 | 250 | 467 |

| Number | Reaction conditions | | Reaction performance | | | |
|---|---|---|---|---|---|---|
|  | Pressure/ MPaG | MS concentration/ vol % | MS conversion/ mol % | DS selectivity/ mol % | TS selectivity/ mol % | Precipitation of solid silicon |
| Comparative Example 1 | 0.12 | 80 | 0.07 | 100 | 0 | None |
| Comparative Example 2 | 0.12 | 80 | 0.13 | 100 | 0 | None |
| Comparative Example 3 | 0.12 | 80 | 0.15 | 100 | 0 | None |

TABLE 5-continued

| | | | | | | |
|---|---|---|---|---|---|---|
| Reference | 0.12 | 80 | 0.04 | 100 | 0 | None |
| Example 1 | 0.12 | 80 | 0.25 | 100 | 0 | None |
| | 0.12 | 80 | 1.13 | 89 | 10.8 | Observed |
| | 0.12 | 80 | 4.75 | 82.6 | 17.2 | Observed |
| Reference Example 2 | 0.2 | 80 | 0.26 | — | — | None |
| Reference Example 3 | 0.2 | 80 | 0.48 | — | — | None |
| Reference Example 4 | 0.2 | 80 | 0.89 | — | — | None |

INDUSTRIAL APPLICABILITY

According to the production process of the present invention, decomposition into solid silicon is inhibited, and a higher silane (for example, disilane when the lower silane is monosilane) is obtained at high yield. This leads to the advantage that a high-purity higher silane (for example, disilane when the lower silane is monosilane) is producible relatively inexpensively.

LIST OF REFERENCE SIGNS

1: Lower silane flowmeter
2: $H_2$ flowmeter
3: Reactor
4: Condenser
5: Electric furnace

The invention claimed is:

1. A catalyst for producing a higher silane which comprises a porous oxide and which by being contacted with a lower silane converts the lower silane to the higher silane having more silicon than the lower silane, wherein the porous oxide has at least regularly arranged pores and is primarily composed of silicon oxide, wherein a content of alkali metals and alkali earth metals in the porous oxide is not less than 0.00 wt % and not more than 2.00 wt %.

2. The catalyst for producing a higher silane according to claim 1, wherein the porous oxide has a pore diameter of not less than 0.4 nm and not more than 0.6 nm.

3. The catalyst for producing a higher silane according to claim 1, wherein the pore of the porous oxide is formed from an 8 to 12-membered oxygen ring.

4. The catalyst for producing a higher silane according to claim 1, wherein the porous oxide has a crystalline zeolite structure formed from aluminosilicate or metallosilicate.

5. The catalyst for producing a higher silane according to claim 4, wherein the crystalline zeolite structure is at least any one of BEA-type, FER-type, LTA-type, MFI-type, MOR-type and MWW-type.

6. The catalyst for producing a higher silane according to claim 4, wherein alkali metal ions or alkali earth metal ions compensating for a negative charge of the aluminosilicate or metallosilicate skeleton in the porous oxide are substituted with hydrogen ions.

7. The catalyst for producing a higher silane according to claim 4, wherein the porous oxide is aluminosilicate, and a $SiO_2/Al_2O_3$ molar ratio in the porous oxide is not less than 10 and not more than 3,000.

8. The catalyst for producing a higher silane according to claim 7, wherein the $SiO_2/Al_2O_3$ molar ratio is not less than 20 and not more than 2,000.

9. A process for producing a higher silane comprising bringing a lower silane into contact with the catalyst for producing a higher silane according to claim 1 thereby converting the lower silane to the higher silane having more silicon than the lower silane.

10. The process for producing a higher silane according to claim 9, wherein the lower silane is brought into contact with the catalyst for producing the higher silane at a temperature lower than a temperature at which the higher silane starts to be substantially produced through thermal decomposition of the lower silane under conditions where no catalysts are present.

11. The process for producing a higher silane according to claim 9, wherein the temperature at which the lower silane is brought into contact with the catalyst for producing a higher silane is not lower than 100° C. and not higher than 400° C.

12. The process for producing a higher silane according to claim 11, wherein the temperature is not lower than 120° C. and not higher than 350° C.

13. The process for producing a higher silane according to claim 11, wherein the temperature is not lower than 140° C. and not higher than 300° C.

14. The process for producing a higher silane according to claim 9, wherein the lower silane is supplied by a raw material gas including a lower silane, and a concentration of the lower silane in the raw material gas is not less than 50 vol % and not more than 100 vol %.

15. The process for producing a higher silane according to claim 9, wherein the lower silane is monosilane, and the higher silane is disilane and trisilane.

16. The process for producing a higher silane according to claim 9, wherein the lower silane is monosilane, and the higher silane is disilane.

17. The process for producing a higher silane according to claim 9, wherein the lower silane is disilane, and the higher silane is trisilane.

18. The process for producing a higher silane according to claim 9, comprising a step of subjecting the catalyst for producing a higher silane to an activation treatment using a hydrogen-containing gas.

19. The process for producing a higher silane catalyst according to claim 18, wherein at the step of subjecting the catalyst for producing a higher silane to an activation treatment using a hydrogen-containing gas, the treatment temperature is not less than 20° C.

* * * * *